United States Patent
Geke et al.

(10) Patent No.: US 6,420,323 B2
(45) Date of Patent: *Jul. 16, 2002

(54) LOW-FOAM EMULGATOR SYSTEM AND EMULSION CONCENTRATE CONTAINING THE SAME

(75) Inventors: Juergen Geke, Duesseldorf; Horst-Dieter Speckmann, Langenfeld; Bernd Stedry, Kempen, all of (DE)

(73) Assignee: Henkel Kommanditgesellschaft auf Aktien, Duesseldorf (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,355

(22) PCT Filed: Jan. 20, 1998

(86) PCT No.: PCT/EP98/00278
§ 371 (c)(1),
(2), (4) Date: Jul. 27, 1999

(87) PCT Pub. No.: WO98/32527
PCT Pub. Date: Jul. 30, 1998

(30) Foreign Application Priority Data

Jan. 29, 1997 (DE) .......................... 197 03 083

(51) Int. Cl.[7] .................. C10M 173/00; B01F 3/08; C11D 1/722
(52) U.S. Cl. .............. 508/532; 508/527; 508/530; 508/579; 508/583; 252/390; 252/396; 510/491; 510/506; 516/30; 516/67; 516/76; 516/134
(58) Field of Search ................ 508/530, 527, 508/532, 579, 583; 516/76, 67, 134, 30; 510/491, 506; 252/390, 396

(56) References Cited

U.S. PATENT DOCUMENTS

| | | | |
|---|---|---|---|
| 3,489,690 A | | 1/1970 | Lachampt et al. .......... 252/308 |
| 4,207,421 A | * | 6/1980 | Scardera et al. |
| 4,445,971 A | * | 5/1984 | Lappi et al. |
| 4,493,776 A | * | 1/1985 | Rhodes |
| 4,780,237 A | | 10/1988 | Schmid et al. ......... 252/174.22 |
| 4,830,768 A | * | 5/1989 | Reich et al. |
| 5,230,730 A | | 7/1993 | Speckmann et al. ..... 106/14.13 |
| 5,259,970 A | * | 11/1993 | Kanamori et al. |
| 5,705,476 A | | 1/1998 | Hoffarth ..................... 510/535 |

FOREIGN PATENT DOCUMENTS

| | | |
|---|---|---|
| CH | 510 455 | 9/1971 |
| DE | 39 33 137 | 4/1991 |
| DE | 42 12 592 | 10/1993 |
| DE | 43 23 908 | 1/1995 |
| DE | 43 23 909 | 1/1995 |
| EP | 0 254 208 | 1/1988 |
| EP | 0 681 865 | 11/1995 |
| JP | 04 318100 | 9/1992 |

OTHER PUBLICATIONS

Patent Abstracts of Japan, vol. 017, No. 154, (1993).

* cited by examiner

Primary Examiner—Jerry D. Johnson
(74) Attorney, Agent, or Firm—Stephen D. Harper

(57) ABSTRACT

A low-foam emulsifier system is presented containing (a) an ethoxylate/propoxylate of one or more $C_8$–$C_{18}$ fatty alcohols, where the ethoxylate/propoxylate contains 2 to 6 ethylene oxide units and 4 to 8 propylene oxide units, with (b) a fatty alcohol propoxylate or distillation residue of fatty alcohol or fatty alcohol propoxylate, where the fatty alcohol contains 12 to 24 carbon atoms and up to three propylene oxide units. The weight ratio of (a) to (b) is from 1:0.3 to 0.3:1. The emulsifier system produces a low amount of foam, and is useful in industrial metal processing applications such as cleaning, corrosion protection or cooling lubricant emulsions.

9 Claims, No Drawings

LOW-FOAM EMULGATOR SYSTEM AND EMULSION CONCENTRATE CONTAINING THE SAME

This application is filed under 35 U.S.C. § 371 and based on PCT/EP98/00278, filed Jan. 20, 1998.

BACKGROUND OF THE INVENTION

FIELD OF THE INVENTION

This invention relates to an emulsifier system which is suitable for the production of low-foaming oil-in-water emulsions in soft water. The emulsifier system may be combined with suitable carboxylic acids to create a corrosion protection system. The present invention also relates to a water-miscible emulsion concentrate containing oil and the present emulsifier system, and to ready-to-use oil-in-water emulsions prepared therefrom. Even in soft water, these emulsions exhibit only a slight tendency to foam and may be used for various industrial metal processing applications, for example as cleaning, corrosion protection or cooling lubricant emulsions.

Corrosion protection emulsions are used as passivating agents for temporarily protecting metallic workpieces from corrosive atmospheric influences. They essentially contain apolar or polar oils, emulsifiers, corrosion inhibitors and water. Conventional commercial systems are based on oil concentrates containing emulsifiers and corrosion inhibitors, but little or no water. The emulsifiers and corrosion inhibitors must thus be soluble in oil. In order to produce oil-in-water emulsions ("O/W emulsions") which are used in dilute form with water, such systems must be self-emulsifying.

Cooling lubricant emulsions, which are used for machining or forming metallic workpieces, have a similar composition to corrosion protection emulsions, as they must also exhibit a corrosion inhibiting action. Lubricating action may be improved by the addition of suitable lubricating additives.

A feature common to all these types of emulsion is that they have a tendency to foam due to the emulsifiers used. The tendency to foam is particularly pronounced if the emulsifier system contains anionic surfactants. In the event of use in hard water, the tendency to foam is decreased by the fact that the anionic surfactants may react with calcium ions to form sparingly soluble salts which have a foam inhibiting action. In soft to medium hardness water, i.e. in water having hardness of less than 12° and in particular of less than 8° dH [German hardness], such emulsions are unusable due to the increased tendency to foam, at least if they are used in spraying applications.

DISCUSSION OF RELATED ART

Emulsifier systems containing only nonionic emulsifiers are known from DE-A-39 33 137 and DE-A-43 23 908. The emulsifier system according to DE-A-39 33 137 consists of at least one addition product of 2 to 20 mol of ethylene oxide on fatty alcohols having 10 to 22 carbon atoms, to which may be added up to an identical number of parts, by weight, of a coemulsifier component consisting of at least one fatty alcohol having 12 to 22 carbon atoms. The emulsifier system according to DE-A-43 23 908 consists of at least one addition product of 5 to 12 mol of ethylene oxide on fatty alcohols having 16 to 18 carbon atoms and at least one addition product of 1 to 2 mol of ethylene oxide on fatty alcohols having 12 to 18 carbon atoms or at least one monoglycerol ester of fatty acids having 16 to 18 carbon atoms. The emulsion concentrates according to both these documents are produced using the so-called "phase inversion process". Disadvantageous features in this connection include the relatively high water content of the emulsion concentrates, the elaborate production process and the low possible inhibitor content of the concentrates. Moreover, the emulsion stability of the concentrate itself must be optimised, so limiting the latitude possible in formulation.

SUMMARY OF THE INVENTION

An object of the present invention is to provide an emulsifier system with which low-water or anhydrous emulsion concentrates for O/W emulsions may be produced by simple stirring. The ready-to-use O/W emulsions obtainable from these concentrates by combination with water should also exhibit only a low tendency to foam even in soft water.

This object is achieved by a low-foam emulsifier system consisting of:
 (a) ethoxylates/propoxylates of fatty alcohols having 8 to 18 carbon atoms in the alcohol with 2 to 6 ethylene oxide units and 4 to 8 propylene oxide units; and
 (b) fatty alcohols and/or fatty alcohol propoxylates having 12 to 24 carbon atoms in the alcohol and 0 to 3 propylene oxide units and/or the distillation residue of these fatty alcohols;
in a ratio, by weight, of (a):(b) of 1:0.3 to 0.3:1.

Narrow limits are thus set on the composition of the emulsifier system and on the molecular structure of the emulsifiers used. On the one hand, according to (a) fatty alcohol ethoxylates/propoxylates bearing both 2 to 6 ethylene oxide units and 4 to 8 propylene oxide units must be present. These hydrophilising components must be combined with the more hydrophobic non-alkoxylated component (b) fatty alcohols having 12 to 24 carbon atoms, the distillation residue thereof or the alkoxylation products thereof containing an average of up to at most 3 propylene oxide units. It is also necessary to comply with the stated approximate ratio, by weight. The distillation residue of fatty alcohols containing 12 to 24 carbon atoms is obtainable as "Pernil® RU" from Henkel KGaA, Düsseldorf. Pernil® RU has been assigned CAS number 68603-17-8.

As described above, this emulsifier system may be formulated with further components to produce cleaning, corrosion protection and/or cooling lubricant emulsions. The emulsifier system may, however, be offered for sale as it is. The purchaser may then use it to prepare the desired type of emulsion. In a first stage, the emulsifier system may be formulated with a corrosion protection component, from which a concentrate for a corrosion protection emulsion may be produced by adding oil. According to a second embodiment, the present invention thus relates to a corrosion protection and emulsifier system consisting of:
 15 to 40 parts, by weight, of one or more straight- or branched-carboxylic acids having 6 to 10 carbon atoms or the anions thereof; and
 15 to 40 parts, by weight, of emulsifier component consisting of:
  (a) ethoxylates/propoxylates of fatty alcohols having 8 to 18 carbon atoms in the alcohol with 2 to 6 ethylene oxide units and 4 to 8 propylene oxide units; and
  (b) fatty alcohols and/or fatty alcohol propoxylates having 12 to 24 carbon atoms in the alcohol and 0 to 3 propylene oxide units and/or the distillation residue of these fatty alcohols;
in a ratio, by weight, of (a):(b) of 1:0.3 to 0.3:1.

DETAILED DESCRIPTION OF THE INVENTION

Since corrosion protection emulsions conventionally have neutral to basic pH values, it is preferable to use the carboxylic acids at least in part in neutralised form, i.e. as salts. Suitable basic components for neutralisation are potassium hydroxide solution and/or alkanolamines, wherein the latter promote the corrosion inhibition action. Due to the risk of forming nitrosamines, it is less preferred to use dialkanolamines for this purpose. Instead, monoalkanolamines or trialkanolamines or, preferably, mixtures thereof are used. In particular, ethanolamines are used.

The carboxylic acids having a corrosion inhibiting action may be straight- or branched-chain.

Mixtures of different acids may be particularly advantageous. Preferred examples of such carboxylic acids are caprylic acid, ethylhexanoic acid, isononanoic acid and isodecanoic acid.

According to another embodiment, the present invention relates to a water-miscible emulsion concentrate containing oil and:

15 to 35 parts, by weight, of an oil component;

30 to 80 parts, by weight, of the corrosion protection and emulsifier system according to one or both of claims 2 and 3;

and, if desired, further auxiliary or active substances.

Such a concentrate may be obtained by adding the appropriate number of parts, by weight, of an oil component to the corrosion protection and emulsifier system described above. It is, of course, also possible to produce such a concentrate by mixing the oil component, the individual emulsifiers of the emulsifier system and the carboxylic acids in any desired sequence. The carboxylic acids may be used directly as salts. For processing reasons, however, it is more advantageous to mix the acids themselves into the other components and to neutralise them by adding alkali metal hydroxide solution, in particular potassium hydroxide solution, and/or alkanolamines only once they have been blended with the oil component and the emulsifier system.

Apolar or polar oils of a petrochemical or natural origin may be used as the oil component. Synthetic oil components are also suitable. Examples of usable oil components are paraffinic or naphthenic mineral oil, dialkyl ethers having 12 to 20 carbon atoms and/or ester oils. Optional further auxiliary or active substances which may be mentioned are: lubricating additives in general and in particular so-called "extreme pressure" additives (known as EP additives), further corrosion inhibitors, such as boric acid or additional alkanolamines, solubilising agents, such as glycols, glycerol or Na cumene sulfonate. Biocides, which extend the service life of the emulsion, may also be added.

The present invention also relates to the ready-to-use oil-in-water emulsion obtainable by combining about 0.5 to about 10 parts, by weight, of the concentrate described above with about 99.5 to about 90 parts, by weight, of water. By virtue of the self-emulsifying characteristics of the emulsion concentrate, the ready-to-use emulsion forms on combination with water spontaneously or after slight mechanical agitation, such as stirring. This emulsion may be used, for example, as a cleaning, corrosion protection or cooling lubricant emulsion. When soft water is used for preparation, the emulsion exhibits the major advantage over prior art emulsions that it has only a slight tendency to foam. The emulsion may thus be used in spray processing within the range of temperatures between the freezing point and the boiling point of the emulsion and requires no minimum temperature for spraying applications. The low foaming characteristics are also noticeable in applications as a cooling lubricant emulsion. Although the novel emulsifier system and the emulsions containing it in particular exhibit their advantages in soft water, they may, however, also be used in hard water without disadvantage.

PRACTICAL EXAMPLES

Some examples of emulsion concentrates according to the present invention containing the present emulsifier system are listed below. They were obtained by stirring the components together in the stated sequence. Table 1 shows the emulsion concentrates produced by way of example.

TABLE 1

Composition (wt. %) of the emulsion concentrates

| Formulation | 1 | 2 | 3 | 4 | 5 | 6 | 7 | 8 |
|---|---|---|---|---|---|---|---|---|
| Pioneer oil 0014-40N | 35.8 | 30.0 | 31.0 | 28.0 | 27.5 | 27.5 | 27.5 | 30.0 |
| Isononanoic acid | 5.0 | 25.0 | 25.0 | 27.0 | | 15.0 | 15.0 | 10.0 |
| Caprylic acid | 15.0 | | | | | 15.0 | 15.0 | 15.0 |
| Isodecanoic acid | | | | | 32.0 | | | |
| Boric acid | | | | | | | | |
| 9-octadecen-1-ol | | 12.5 | 12.5 | 12.5 | 5.5 | 5.5 | 5.5 | 12.0 |
| $C_{12/14}$ fatty alcohol + 3 EO + 6 PO | 8.0 | 12.5 | | | | 12.5 | 6.0 | |
| $C_{12/14}$ fatty alcohol + 2 EO + 4 PO | | | | | 13.0 | | 6.0 | 12.0 |
| $C_{12/14}$ fatty alcohol + 5 EO + 4 PO | | | 12.5 | | | | | |
| $C_{12/18}$ fatty alcohol + 4 EO + 5 PO | | | | 12.5 | | | | |
| Oleyl/cetyl alcohol + 2 PO | 6.0 | | | | | | | |
| 1,2-dipropylene glycol | 1.0 | | | | | 1.0 | 1.2 | 1.2 |
| Glycerol | | | | | | | | |
| 45% KOH | 10.2 | 15.0 | 15.0 | 16.0 | 17.5 | 19.0 | 19.0 | 14.9 |
| Monoethanolamine | 5.0 | 5.0 | 4.0 | 4.0 | 4.5 | 4.5 | 4.8 | 4.9 |
| Pernil ® RU[1] | 14.0 | | | | | | | |
| Rhodafac ® PA35[2] | | | | | | | | |
| Na cumene sulfate | | | | | | | | |

| Formulation | 9 | 10 | 11 | 12 | 13 | 14 |
|---|---|---|---|---|---|---|

TABLE 1-continued

Composition (wt. %) of the emulsion concentrates

| | | | | | | |
|---|---|---|---|---|---|---|
| Pioneer oil 0014-40N | 30.0 | 30.0 | 30.0 | 30.0 | 30.0 | 26.5 |
| Isononanoic acid | 10.0 | 10.0 | 17.5 | 16.0 | 17.5 | 17.5 |
| Caprylic acid | 15.0 | 15.0 | 10.0 | 10.0 | 7.5 | 10.0 |
| Isodecanoic acid | | | | | | |
| Boric acid | | | | | | 1.5 |
| 9-octadecen-1-ol | | | | | | |
| $C_{12/14}$ fatty alcohol + 3 EO + 6 PO | | | | | 8.0 | 8.0 |
| $C_{12/14}$ fatty alcohol + 2 EO + 4 PO | 12.0 | 12.0 | 8.0 | 8.0 | | |
| $C_{12/14}$ fatty alcohol + 5 EO + 4 PO | | | | | | |
| $C_{12/18}$ fatty alcohol + 4 EO + 5 PO | | | | | | |
| Oleyl/cetyl alcohol + 2 PO | 12.0 | 12.0 | 8.0 | 8.0 | 8.0 | 8.0 |
| 1,2-dipropylene glycol | 1.2 | 0.5 | | | | |
| Glycerol | | | | | | 4.5 |
| 45% KOH | 14.9 | 15.1 | 12.5 | 11.4 | 10.5 | 24.0 |
| Monoethanolamine | 4.9 | 4.9 | 7.9 | 7.9 | 7.9 | |
| Pernil ® RU[1] | | | | 4.7 | 10.6 | |
| Rhodafac ® PA35[2] | | 0.5 | | | | |
| Na cumene sulfate | | | 6.1 | 4.0 | | |

[1]Pernil RU = distillation residue from fatty alcohol distillation.
[2]Rhodafac PA 35 = oleyl/cetyl alcohol + 5 EO mono/diphosphate, Rhône-Poulenc.

Foaming behavior

Using emulsions produced from the concentrates according to formulations 1, 2, 3, 4, 8, 9 and 13, 2 wt. % emulsions were prepared in water having a degree of hardness of 3° dH [German hardness]. 10 l portions of these emulsions were sprayed at temperatures in a range between about 30 and about 45° C. at a spraying pressure of 5 bar for a period of 60 minutes in a single nozzle spraying unit. Foam height, defined as the height of the foam above the level of the liquid in the starting condition, was measured during operation of the spraying unit. In all cases, foam height was less than 2 cm.

Comparative tests

| Formulation: | V1 | V2 | V3 |
|---|---|---|---|
| Pioneer oil 0014-40N | 30.00 | 30.00 | 37.00 |
| Isononanoic acid | 25.00 | 25.00 | — |
| Potassium hydroxide solution, 45% | 15.00 | 15.00 | 8.00 |
| Monoethanolamine | 5.00 | 5.00 | 5.00 |
| Oleyl alcohol | — | 12.50 | 12.50 |
| $C_{12/14}$ fatty alcohol + 3 EO + 6 PO | 12.50 | — | 12.50 |
| Oleyl/cetyl alcohol + 5 EO | 12.50 | 12.50 | — |
| Oleic acid | — | — | 25.00 |
| | 100.00 | 100.00 | 100.00 |

Foaming tests were performed in the spraying unit as described for all three formulations (20 g/l in water having 3° dH [German hardness]).

Results:

The unit shuts down automatically when a foam height of 7 cm is reached. The Table shows the time to shut down, i.e. on the basis of this test, none of the formulations may be classed as "sprayable" or "low-foam".

| Formulation: | V1 | V2 | V3 |
|---|---|---|---|
| Room temperature (23° C.) | 1.5 min | 2 min | 1.5 min |
| 40° C. | 2 min | 2.5 min | 2 min |

Corrosion protection

Using the concentrates according to formulations 1, 5, 9, 10, 11 and 13, 2.5 wt. % emulsions were prepared in water having a degree of hardness of 3° dH [German hardness]. Using these, a corrosion protection test was performed in accordance with the chip/filter paper method to German standard DIN 51 360/2, as is usual for water-mixed cooling lubricant emulsions. To this end, cast iron chips are wetted on a round filter paper with the emulsion and kept at room temperature for 2 hours in a glass dish. The corrosion marks on the filter paper are then assessed visually and rated in accordance with the degrees of corrosion 0 to 4. Degree of corrosion 0 means no corrosion, degree of corrosion 1 means traces of corrosion, degree of corrosion 2 means slight corrosion, degree of corrosion 3 means moderate corrosion and degree of corrosion 4 means severe corrosion. For the emulsions according to formulations 1, 5, 10, 11 and 13, the degree of corrosion was 0 and for the emulsion according to formulation 9 it was between 0 and 1.

Corrosion performance was additionally determined with emulsions prepared from formulations 1, 7 and 13 using a climatic plate test, as is typical for corrosion protection emulsions. To this end, 2 wt. % emulsions of the stated concentrates were prepared in water of a degree of hardness of 20° dH [German hardness]. Test sheets of steel St 1405 were cleaned with scouring powder and a brush, rinsed under running tap water and completely deionised water, dipped in ethanol and then blown dry with de-oiled compressed air. The sheets were then sprayed with the individual emulsions for 3 minutes at a spray pressure of 3 bar and a temperature of 65° C. and dried for 2 to 3 hours in a laboratory atmosphere. The sheets are then stored in closed climatic cabinets at room temperature and various atmospheric humidities. Corrosion is assessed visually each day for the first week and then twice weekly. The test is concluded after 40 days or once 30% surface corrosion is reached. On the basis of these findings, a corrosion protection value (CPV) is determined using the following method. The higher the value achieved, the better is the corrosion protection action. The maximum value of 112 indicates maximum corrosion protection for 40 days.

The following method is used to calculate the corrosion protection value, CPV:

$$CPV = A+B+C \leq 112$$

|  |  | Limit value |
|---|---|---|
| A = | no corrosion (0%), no. of days | $\leq 12$ |
| B = | slight corrosion ($\leq 1\%$), no. of days | $\leq 40$ |
| C = | $C_1$ + bonus $C_2$ | $\leq 60$ |
| $C_1$ = | (no. of days up to 30% corrosion) × 0.5 | $\leq 20$ |
| $C_2$ = | bonus as per table if corrosion observed after 40 days is <30% | $\leq 40$ |

Table to determine bonus $C_2$:

| Corrosion after 40 days: | |
|---|---|
| | $\geq 30\%$ - 0 |
| | 20% - 10 |
| | 10% - 20 |
| | 5% - 30 |
| | $\leq 1\%$ - 40 |

Corrosion protection values achieved:

| | Relative atmospheric humidity | | | |
|---|---|---|---|---|
| Formulation | 65% | 76% | 86% | 100% |
| 1 | 112 | 112 | 68 | 6 |
| 7 | 112 | 112 | 2 | 10 |
| 13 | 112 | 112 | 4 | 11 |

Emulsion stability

Using the concentrates according to formulations 1, 6, 9, 12, 13 and 14, 2 wt. % emulsions were prepared in water having a degree of hardness of 20° dH [German hardness]. After 48 hours, emulsion stability was determined in accordance with German standard DIN 51 367.
Result:

| Formulation | 1 | 6 | 9 | 12 | 13 | 14 |
|---|---|---|---|---|---|---|
| Emulsion stability | 92% | 85% | 95% | 95% | 93% | 87% |

What is claimed is:

1. A corrosion protection and emulsifier concentrate composition consisting essentially of:
   (a) 15 to 40 parts by weight, per 100 parts by weight concentrate composition, of a low foam emulsifier composition consisting essentially of:
      (i) at least one ethoxylate/propoxylate of at least one fatty alcohol containing 8 to 18 carbon atoms, wherein said ethoxylate/propoxylate contains 2 to 6 ethylene oxide units and 4 to 8 propylene oxide units; and
      (ii) at least one fatty alcohol or fatty alcohol propoxylate wherein the fatty alcohol contains 12 to 24 carbon atoms and the fatty alcohol propoxylate contains up to three propylene oxide units, wherein the weight ratio of (i) to (ii) is from 1:0.3 to 0.3:1; and
   (b) 15 to 40 parts by weight, per 100 parts by weight concentrate composition, of at least one straight or branched-chain carboxylic acid having 6 to 10 carbon atoms or a salt thereof.

2. The corrosion protection and emulsifier concentrate of claim 1 wherein at least one carboxylic acid or salt thereof is selected from the group consisting of caprylic acid, ethylhexanoic acid, isononanoic acid and isodecanoic acid and salts thereof.

3. The corrosion protection and emulsifier concentrate of claim 1 wherein at least one potassium or alkanolammonium salt of a carboxylic acid is present.

4. The corrosion protection and emulsifier concentrate of claim 3 wherein the alkanolammonium salt comprises a salt of mono- or trialkanolamine.

5. The corrosion protection and emulsifier concentrate of claim 4 wherein the alkanolammonium salt comprises a salt of ethanolamine.

6. An oil-in-water emulsion consisting essentially of:
   (a) 0.5 to 10 parts by weight, per 100 parts by weight oil-in-water emulsion, of a water-miscible emulsion concentrate consisting essentially of:
      (i) 30 to 80 parts by weight, per 100 parts by weight emulsion concentrate, of the corrosion protection and emulsifier concentrate of claim 1; and
      (ii) 15 to 35 parts by weight, per 100 parts by weight emulsion concentrate of an oil, and
   (b) 90 to 99.5 parts by weight, per 100 parts by weight oil-in-water emulsion, of water.

7. The emulsion of claim 6 wherein the water is soft water.

8. A process for providing cleaning, corrosion protection or cooling to a metal surface comprising the step of contacting the oil-in-water emulsion of claim 6 with the metal surface.

9. The process of claim 8 wherein contact of the oil-in-water emulsion with the metal surface is done by spray processing in a temperature range from the freezing point of the emulsion to the boiling point of the emulsion.

* * * * *